(12) United States Patent
Schoedinger et al.

(10) Patent No.: US 7,692,812 B2
(45) Date of Patent: Apr. 6, 2010

(54) SYSTEM, METHOD AND APPARATUS FOR REGISTRATION OF PRINTED IMAGE TO MEDIA ORIENTATION

(75) Inventors: Kevin Dean Schoedinger, Lexington, KY (US); Mark Stephen Underwood, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1113 days.

(21) Appl. No.: 11/336,375

(22) Filed: Jan. 20, 2006

(65) Prior Publication Data

US 2007/0171447 A1 Jul. 26, 2007

(51) Int. Cl.
*G06F 15/00* (2006.01)
*G08B 13/14* (2006.01)

(52) U.S. Cl. .................................. 358/1.18; 340/572.1

(58) Field of Classification Search ................ 358/1.18, 358/1.15, 1.16, 1.12, 1.14, 1.13, 473; 340/572.1, 340/572.4, 572.6, 686.1, 505, 572.8, 5.61; 715/810, 860, 744; 235/492, 385, 383, 380, 235/488; 400/60, 61, 70, 76, 693, 578, 613, 400/88, 691, 621, 679

See application file for complete search history.

(56) References Cited

U.S. PATENT DOCUMENTS

| | | | |
|---|---|---|---|
| 6,246,326 B1 | 6/2001 | Wiklof et al. | |
| 6,593,853 B1 | 7/2003 | Barrett et al. | |
| 2002/0096823 A1* | 7/2002 | Hwang et al. | 271/207 |
| 2005/0225586 A1* | 10/2005 | Brenner | 347/19 |
| 2005/0286956 A1* | 12/2005 | Braun et al. | 400/630 |

* cited by examiner

*Primary Examiner*—Saeid Ebrahimi Dehkordy

(57) ABSTRACT

A printing system (250) includes a printing subsystem (255) in the form of a printer assembly (14). The printing subsystem (255) includes a printer housing (257) in which a print engine (259) resides and (261) for storing data indicating the expected orientation of labels on a sheet of RFID label media (18). The contents of memory (261) can be obtained from an end user application (270) which may supply the position data to the printing subsystem (255) in a print data stream. Pre-programmed position data is read from a radio frequency memory storage device (88) on print media (18) having one or more devices (88) embedded thereon. The expected orientation data is compared to actual orientation data in order to determine if an image to be printed on a label (20) should be registered by rotation and/or flipping of the image and/or media.

23 Claims, 4 Drawing Sheets

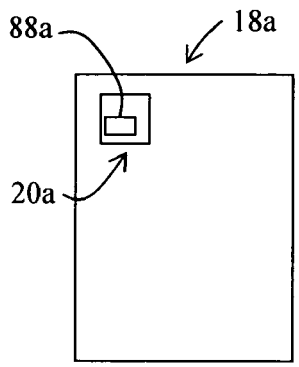
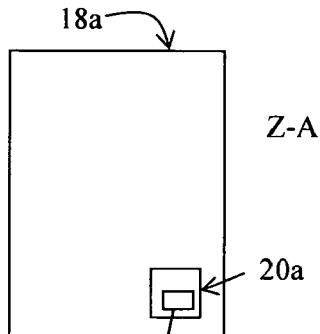
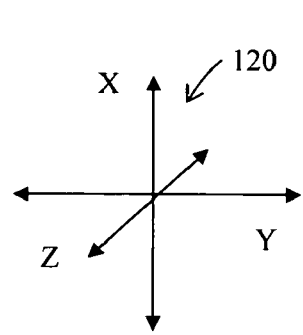
Fig. 2a        Fig. 2b        Z-Axis Rotation
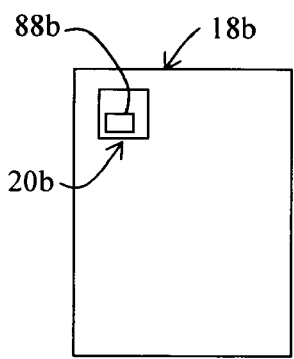
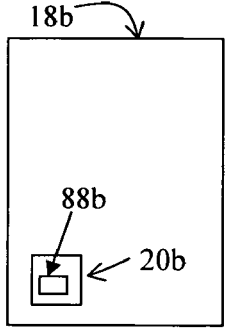
Fig. 2c        Fig. 2d        Y-Axis Rotation
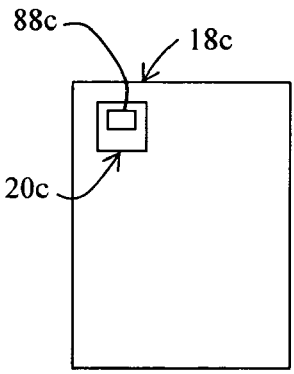
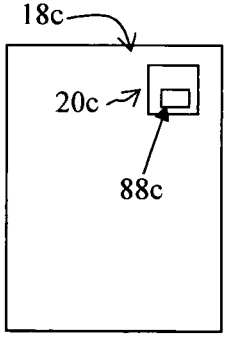
Fig. 2e        Fig. 2f        X-Axis Rotation

SYSTEM, METHOD AND APPARATUS FOR REGISTRATION OF PRINTED IMAGE TO MEDIA ORIENTATION

TECHNICAL FIELD

The invention relates to a method of registering data according to the orientation of media having one or more labels and one or more radio frequency based data storage devices. More particularly, the invention relates to the rotation and/or flipping of an image or media based on the orientation of the media as it passes through an image fixing system. Still more particularly, the current orientation of the media is compared to an expected orientation and, if they do not match, an image registration operation is performed before an image is fixed on a label portion of the media.

BACKGROUND OF THE INVENTION

A recent innovation in the printing industry involves the use of print media with embedded radio frequency signatures in the form of Radio Frequency Identification (RFID) transponders or "tags" or similar devices. A tag or "RFID label" is a piece of label print media with an embedded RFID transponder in the label portion of the media. Such types of media may be used with a variety of existing printing methods.

It is a common requirement when printing labels that the printed image be properly registered or oriented to the media. This ensures an image is placed upon the appropriate label. RFID labels share this requirement with the added condition that the data programmed into the tags must also be properly associated with the image printed on the label.

For example, a sheet may have six identical labels symmetrically arranged in two columns of three labels each. This sheet may be fed with either end being the leading edge, and the resulting printed page will be identical. In such a case, a 180-degree rotation of the media produces an acceptable result. However, if only a subset of the labels contains an RFID tag (say, only one or two) and these tags are arranged in a nonsymmetrical manner, then a 180-degree rotation of the media will cause an unacceptable result, i.e. information will be printed on the wrong RFID label.

The relatively high cost of RFID tags further emphasizes the need for proper registration, both in increased costs and the time it takes to perform the image fixing and write operations on the RFID label. In addition, it is possible and even likely, to produce label media where the arrangement of labels is symmetric but the arrangement of RFID tags is not, further complicating the orientation problem.

Accordingly, as the printing on media with embedded RFID tags is rapidly becoming a growing area of label printing, there is a need to avoid the wastes associated with misorientations of media. It is desirable that the same efficiencies found in multi-label sheets of traditional label media be realized in RFID embedded media. The problem this presents is the need to correlate the printed data on the media sheet with the data programmed into each tag on the media. As such, a means of properly registering an image and tag data according to the orientation of the media to ensure correspondence between an image fixed on a label and data written to its corresponding RFID tag would provide numerous advantages.

BRIEF DESCRIPTIONS OF THE DRAWINGS

The present invention is illustrated by way of example and not limitation in the figures of the accompanying drawings in which like references indicate similar elements, and in which:

FIGS. 2a-2f show different forms of rotations which the system of FIG. 1 can accomplish about Z, Y and X axis, respectively;

DETAILED DESCRIPTION

Figure 1:
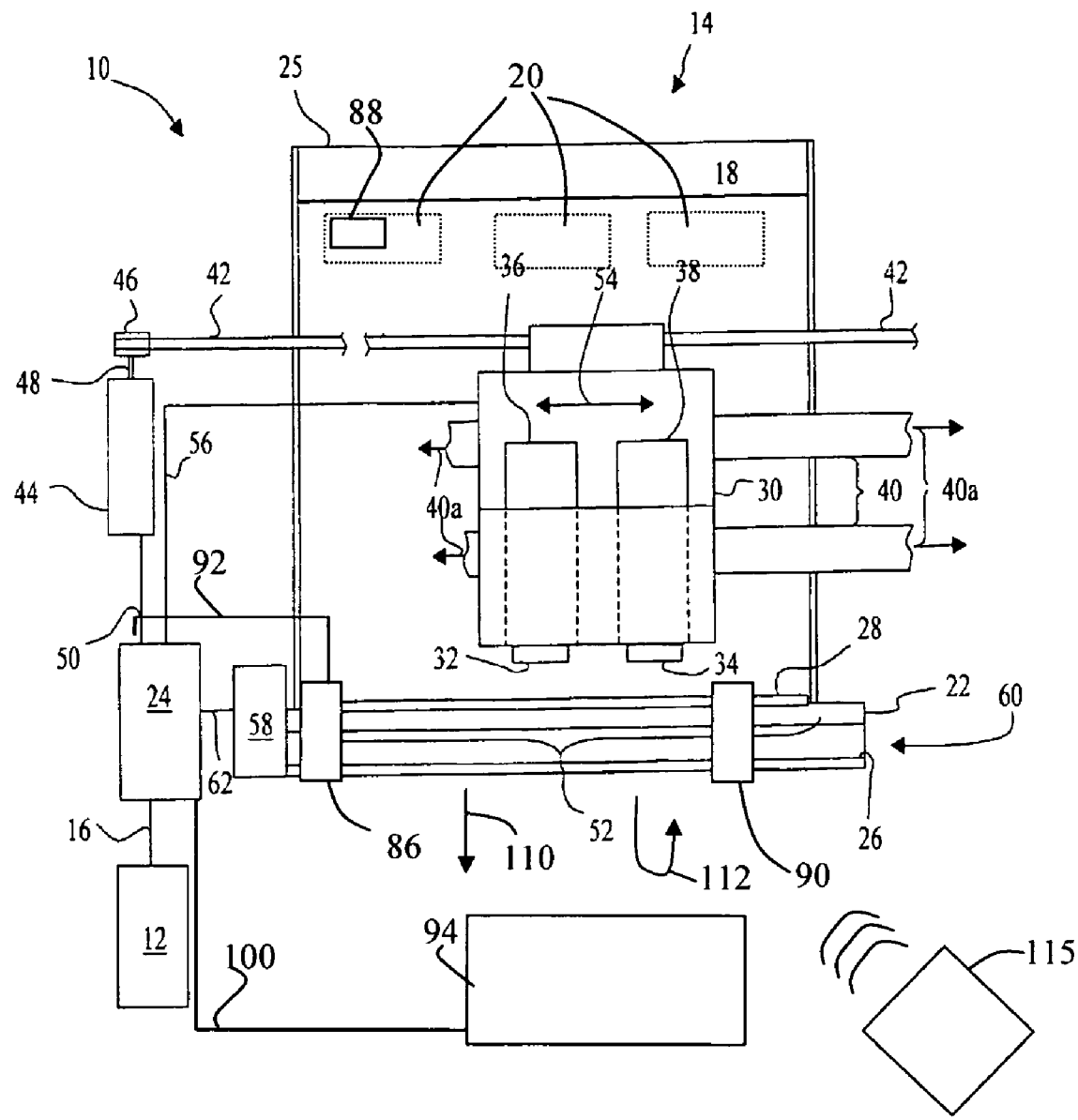
FIG. 1 is a diagram of an image forming system supporting image fixing operations on media having at least one label portion and one or more embedded radio frequency data storage devices according to the invention.

Referring now to the drawings and more particularly to FIG. 1, therein is shown an image forming system 10 supporting image fixing and registration operations on media having at least one label portion and one or more embedded radio frequency data storage devices 88. The devices may comprise RFID tags of the type readily available in industry. In general, system 10 is capable of registering data to be fixed on the media 18 based on the orientation of label portions 20. The media 18 contains one or more radio frequency data storage devices 88 which are embedded on a cut sheet of print media 18. It should be understood that while media 18 is shown to have a single device 88 various forms of media may be utilized having many radio frequency based data storage devices which may be arranged on the media 18 in a multitude of configurations such as symmetrically, asymmetrically, in columns and rows, or at specific locations about the media, for example.

System 10 may include a printer assembly 14 such as, for example, an ink jet or laser printer or other image forming platform. For convenience, system 10 will be described in connection with an ink jet printer although it should be understood the system 10 of the invention may be implemented in other image forming platform such as a laser or dye diffusion printer, for example.

In general system 10 supports many of the typical operations provided by a modern printer or other image forming apparatus. Some of the operational details of system 10 are described herein in order to set forth a specific embodiment of the invention according to one embodiment. It should be understood, however, that not every detail of such a system is presented herein as such aspects of printer functionality and operation are readily understood by those of ordinary skill.

Thus, in operation, a host 12 may be communicatively coupled to printer assembly 14 by way of communications link 16 and may include one or more end-user applications capable of generating a print request. Communications link 16 may be established by, for example, a direct connection, such as a cable connection, between printer assembly 14 and host 12; by a wireless connection; or by a network connection, such as for example, an Ethernet local area network (LAN) or a wireless networking standard, such as IEEE 802.11. Although not shown, host 12 may include a display, an input device such as a keyboard, a processor and associated memory. Resident in the memory of host 12 may be printer driver software which places print data and print commands in a format that can be recognized by printer assembly 14. The format can be, for example, a print data stream that includes print data and printing commands for a given print request and may include a print header that identifies scan data. The printer driver software may also include print media information such as, for example, media type and size. In addition, such print media information may include the known fixed position locations of one or more radio frequency data storage devices 88 which may be part of the media 18 (for simplicity, the terms "device" and "devices" shall be used interchangeably throughout). An example of such media 18 would include a cut sheet of embedded print media having one or more "Smart" labels or other similar cut-sheet print media.

Of course, it may be desirable to write data to the radio frequency data storage device 88 that is related to one or more of the label portions 20 (for simplicity the terms "label portions", "labels" and "label" shall be used interchangeably throughout). For example, the address information for a particular addressee whose information is printed on a label can also be written to the device 88 in order to facilitate handling of a package bearing the label 20. Many other applications are also known or contemplated. Likewise, devices 88 may be preprogrammed with data indicative of the relative position of the labels 20 about the media 18. This provides a way of determining the expected orientation of the label 20 about the media 18. In addition, the print data stream received by system 10 may include at least two types of data: print data to be used by the print engine and data to be programmed into the radio frequency based data storage device 88.

FIG. 1 shows that printer assembly 14 includes a midframe 22, a master controller 24, a print media source 25 and an exit tray 26. Print media source 25 is configured and arranged to supply individual sheets of media 18 during a printing operation. Printhead carrier 30 may carry, for example, a color printhead 32 and black printhead 34. A color ink reservoir 36 is provided in fluid communication with color printhead 32 and a black ink reservoir 38 is provided in fluid communication with black printhead 34. Reservoirs 36, 38 may be located near respective printheads 32 and 34, which in turn may be assembled as respective unitary cartridges. Alternatively, reservoirs 36, 38 may be located remote from printheads 32, 34, e.g., off-carrier, and reservoirs 36, 38 may be fluidly interconnected to printheads 32, 34, respectively, by fluid conduits. Printheads 32 and 34 may be configured for unidirectional printing or bi-directional printing.

Printhead carrier 30 is guided by a pair of guide rods 40. Alternatively, one of guide rods 40 could be a guide rail made of a flat material, such as metal. The axes 40a of guide rods 40 define a bi-directional-scanning path, also referred to as 40a, of printhead carrier 30. Printhead carrier 30 is connected to a carrier transport belt 42 that is driven by a carrier motor 44 by way of a driven carrier pulley 46. Carrier motor 44 has a rotating carrier motor shaft 48 that is attached to carrier pulley 46. Carrier motor 44 is electrically connected to print controller 24 via communications link 50. At a directive of print controller 24, printhead carrier 30 is transported, in a reciprocating manner, along guide rods 40. Carrier motor 44 can be, for example, a direct current motor or a stepper motor.

The reciprocation of printhead carrier 30 transports ink jet printheads 32 and 34 across the sheet of media 18 along bi-directional scanning path 40a to define a print area 52 of printer assembly 14 as a rectangular region. This reciprocation occurs in a scan direction 54 that may be parallel with bi-directional scanning path 40a and may be also commonly referred to as the horizontal scanning direction. Printheads 32 and 34 are electrically connected to print controller 24 via communications link 56.

During each printing pass, i.e., scan, of printhead carrier 30, while ejecting ink from printheads 32 and/or 34, the sheet of media 18 may be held stationary. Before ink ejection begins for a subsequent pass, the sheet of media 18 is transported in an incremental, i.e., indexed, fashion to advance the sheet of media 18 into print area 52. Following printing, the printed sheet of media 18 is delivered to print media exit tray 26. A drive unit 58 coupled to a sheet handling unit 60 may facilitate this operation. Drive unit 58 is electrically connected to print controller 24 via communications link 62, and provides a rotational force which is supplied to sheet handling unit 60.

As such, printer assembly 14 provides a print media pathway, the direction of which is represented by arrow 110, for the transport of media 18 from a paper source 25 to a designated print area 52. In other printer configurations, the print media pathway may include a path that allows the media 18 to be flipped for duplex printing on the other side of the media 18. The direction of travel during duplex printing is indicated by arrow 112 of FIG. 1. Thus, system 10 provides the ability to print on both sides of the media 18 by automated "flipping" of the media 18 without user intervention.

Printer assembly 14 may also include a print media sensor 86 capable of detecting when media 18 has reached a predetermined point along the print media pathway 110. Print media sensor 86 may be configured to detect the leading edge of the media 18 as it is conveyed through the printer assembly 14. In addition to, or alternatively, the print media sensor 86 may detect the trailing edge of the media 18. In this regard, the leading edge of the media 18 is defined as the media edge which enters the printing device's print area 52 first and the trailing edge is equivalently to that edge which enters the print area 52 last.

The invention has particular application and provides particular advantages in the context of modern day image forming apparatus, such as printer assembly 14 and other commercially available types of printer platforms, where print media, such as media 18, contains one or more radio frequency data storage devices 88 to which data can be written using an industry standard radio frequency data reader/programmer 115 for writing data to and/or reading data from one or more radio frequency data storage devices 88. Such reader/programmers 115 are readily available and their details of operation and use will not be presented here as they are well known to those of ordinary skill. The use of such reader/programmer 115 to write data to devices 88 allows data relating to images fixed on the labels 20 to be stored in the devices 88 following an image fixing operation.

System 10 also includes control logic represented by block 94. Essentially, the control logic 94 comprises the operational intelligence supporting the various image forming and registration functions of an image forming system, such as system 10, according to the invention. Thus control logic 94 may include or comprise what is commonly known or referred to as the image processing logic or Raster Image Processor ("RIP") code of the system 10. In addition, control logic 94 may be adapted to provide the image and/or media registration operations according to the invention which facilitate an image or media to be rotated and/or flipped in order to ensure an image fixed to a label 20 is properly oriented about the media and the corresponding device 88 associated with the label 20. The fact that control logic 94 can rotate or flip an image before fixing it on a label 20 of the media 18 provides a way of properly registering the image according the relative position of the label 20 about the media 18 without user intervention.

In addition, some image forming systems, such as system 10, have the ability to flip media from one side to another side as required to accommodate duplex printing. This image rotation can be performed very late in the printing process (shortly before physical imaging is performed), because the entire image is typically rendered prior to printing. The fact that media 18 can be flipped from one side to another provides another way of correctly registering an image to a label according to the relative position of the label 20 about the media 18.

FIGS. 2a-2f illustrate the type of image and media registration operations which may be performed according to the invention. For reference, a coordinate system 120 defines three axes of rotation X, Y, and Z about which an image 122 or sheet of media 18 may be rotated and/or flipped. The "X" axis may be defined as the axis parallel to the direction of travel of the media 18 through the media pathway of the image forming system. Thus, for a portrait-oriented printer, the X axis runs parallel to the long edge of a letter size sheet. Likewise, the "Y" axis may be defined as the axis perpendicular to the direction of motion of the media 18, but in the same plane as the media 18. This axis may be considered parallel to the short edge of a letter size sheet of media. The "Z" axis, therefore, is the axis perpendicular to the plane of the media. As such, FIGS. 2a-2f represent 3-axis of rotation, respectively, and an example of how an image or a page of media 18 may be rotated and/or flipped in each axis.

In general, the mechanics of a paper feeding operation in a printer may restrict the rotational errors to +/−180 degrees in each axis of rotation. For certain paper sizes smaller than the "standard" size, it may be possible to have rotations in 90 degree increments in the Z plane.

Referring to FIG. 1, in an RFID enabled system, such as system 10, capable of handling multiple RFID tags on a sheet of media 18, the control logic 94 must have a means of detecting the presence and location of the devices 88 on the media 18. As indicated above, this can be accomplished by data received in the print data stream or through the use of a print driver having specific orientation information specific to the type of media being utilized, or by writing the data within the devices 88 ahead of time, for example. In any event, the control 94 logic should be able to determine the arrangement and location of all the devices 88 on the sheet of media 18. This information will allow the control logic 94 to determine the orientation in several planes of rotation.

Following is a description of each type of registration operation which control logic 94 may support.

Z Axis Rotations:

Referring to FIGS. 2a and 2b, if a sheet of media has been incorrectly placed backwards in the image forming system then FIG. 2a represents the expected orientation of a sheet of media 18a while FIG. 2b shows the actual orientation of the media 18b. The proper registration of an image to be fixed to labels of the media 18a can be accomplished by a rotation in the Z-axis (see reference coordinate system 120) to correctly place an image to be printed on label 20a (and, consequently, the data to be written to radio frequency data storage device 88a) using the orientation depicted in FIG. 2b. Such a rotation of the image can be accomplished by the RIP code of the control logic 94, for example, without interference from the user. Thus, the sheet of media 18a has a radio frequency data storage device 88a in the upper left label 20a and the control logic 94 detects that the media 18a had been incorrectly fed through the image forming system to cause a rotation of the media 18a such that the device 88a and label 20a are now in the lower right position as indicated by FIG. 2b. By comparing the actual orientation of the media with the expected orientation, the printer control logic 94 can determine that the actual media should be rotated 180 degrees about the "Z" axis with respect to the expected orientation (FIG. 2b). The printer control logic 94 then rotates the image 180 degrees in the same plane. This will match the printed image with the actual page orientation. The RFID control logic may also "rotate" the assigned locations of the device 88a so that the correct data is programmed into the device 88a corresponding to the image fixed on the label 20a.

Y Axis Rotations:

Referring to FIGS. 2c and 2d, a rotation in the Y-axis implies the media is "upside down" as illustrated by FIG. 2d instead of the expected orientation of FIG. 2c. If no action is taken, the image printed on label 20b will be printed on the back side of the media 18b. It is not possible to correct this problem with a simple image rotation prior to printing. However, if the printer is capable of printing duplex pages, the rotation can be correcting by converting the page into a duplex page with a blank "back side." By feeding the media 18b through a duplex mechanism of the image forming system, the media will be physically flipped over so that the proper side to be imaged is presented to the print station on the second pass through the image forming system. As with Z-axis orientation described above, this operation can be handled by the control logic 94 without user intervention.

X Axis Rotations:

FIG. 2f depicts another type of mis-orientation of a sheet of media 18c within the media pathway of the image forming system. As shown, a 180 degree X-axis rotation can be achieved by combining 180 degree rotations in both the Y-axis and Z-axis. This means that a 180 degree X-axis rotation can be corrected by applying both the Z-axis (image rotation) and Y-axis (duplex flipping) corrections.

Special Cases:

There are some special cases to consider. In the case that the arrangement of labels 20 is not symmetrical, but the arrangement of devices 88 is, it may not be possible to detect the mis-orientation of the media 18. However, there may be some means of detecting this mis-orientation that does not depend upon the device 88. In that case, the corrections still apply.

It may be that the labels 20 are physically identical and symmetrically arranged, but some other attribute of the device 88 makes the arrangement asymmetrical. For example, the otherwise identical devices 88 may be preprogrammed with an index value or X/Y position data. In this case, the RFID controller may be able to resolve the mis-orientation by reassigning the data to be programmed into each device 88.

In the case that the specific printer system on which this algorithm is implemented is incapable of making one or more of the corrective rotations required (for example, a non-duplex machine), the printer system can either call a general paper-orientation error, or provide instructions to the user on how to rotate the page to correct the mis-orientation.

Figure 3:
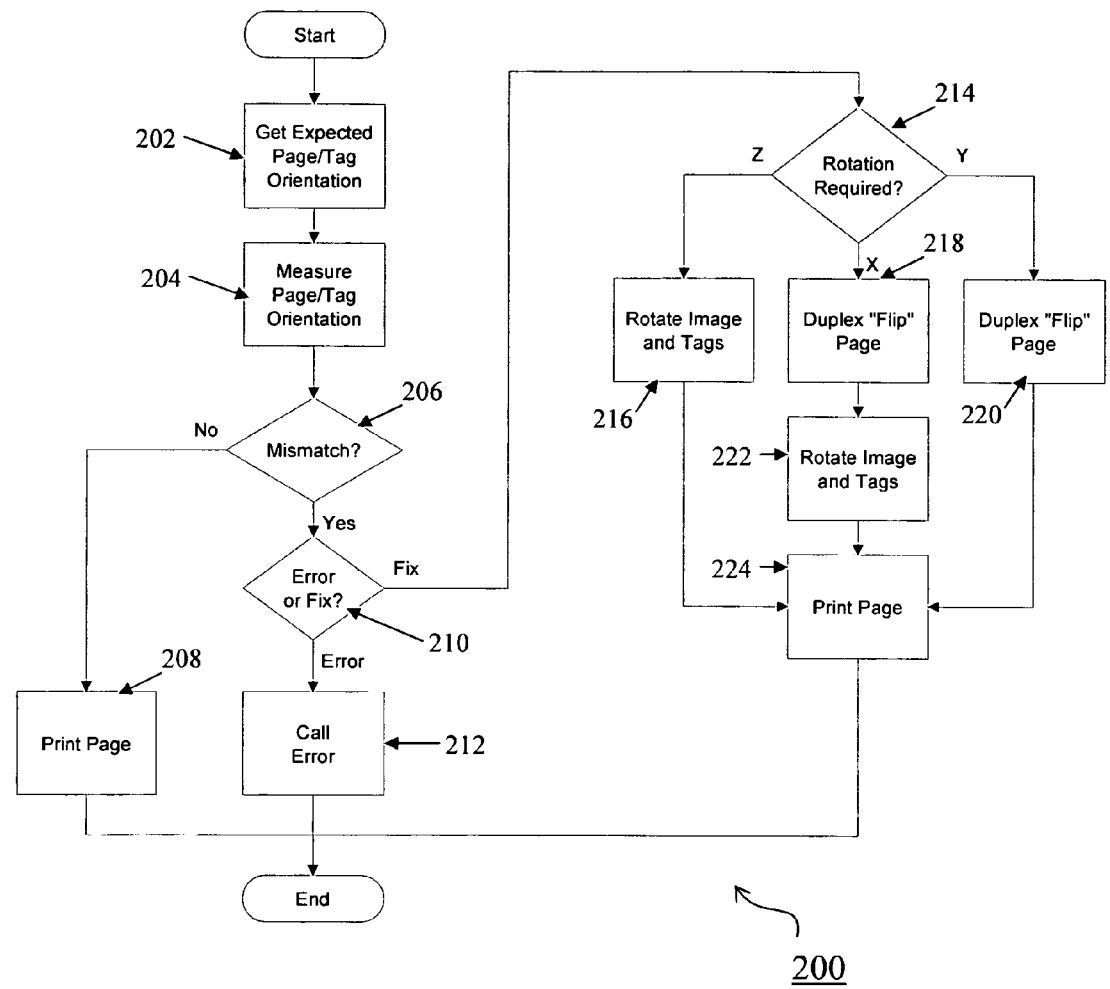
FIG. 3 is a process flow diagram for a method of registering data to be fixed on media according to the invention.

FIG. 3 is a process flow diagram for a method, denoted generally as 200, of registering data to be fixed on media, such as media 18, according to the invention. As shown, process flow begins at step 202 wherein the system obtains the expected page and/or label and/or device orientation information indicating the relative position of labels 20 and/or radio frequency memory storage devices 88 on a sheet of media 18. This expected orientation may be supplied by the input data stream, or can be defined in a number of other ways. Next, at step 204, the actual media/device and/or label orientation is determined and passed to the printer control logic 94. At this point, the actual orientation of the media is compared to the expected media orientation, step 206. If no mismatch is detected, the image is printed on the media in its current configuration, step 208.

On the other hand, if the actual media orientation does not match the expected orientation as determined at step 206, process flow is directed to step 210 wherein it is determined if the orientation error can be fixed or if an error message should be generated to the user. If the mis-orientation condition can not be fixed, then an error message is generated at step 212.

If it is determined that proper registration of an image can be achieved, process flow is directed to step 214 wherein it is determined whether the image and/or media can be rotated and/or flipped. At this point, registration of the image and/or media can proceed as indicated above and in steps 216, 218, and 220. Specifically, steps 216, 218, and 220 correspond to Z-axis, X-axis, and Y-axis orientation, respectively, of a label and/or media in order to achieve proper registration of an image to be printed on a label portion of such media according to the orientation of the media as it passes through a media pathway of an image forming system, such as system 10. Thus, the proper rotation is determined for adjusting the print image to match the actual page orientation. The print data for the page may be modified by the control logic 94 using methods similar to page rotation for duplex printing prior to image submission to the print engine. The required corrective rotation may be communicated back to the system controller allowing the corresponding registration operations to be performed, step 222. Finally, the image can be printed at step 224.

Similarly, the determination of a rotational mismatch can be made by the RFID controller, having received the expected rotation from the print controller, and the resulting corrections communicated up to the print controller.

Figure 4:
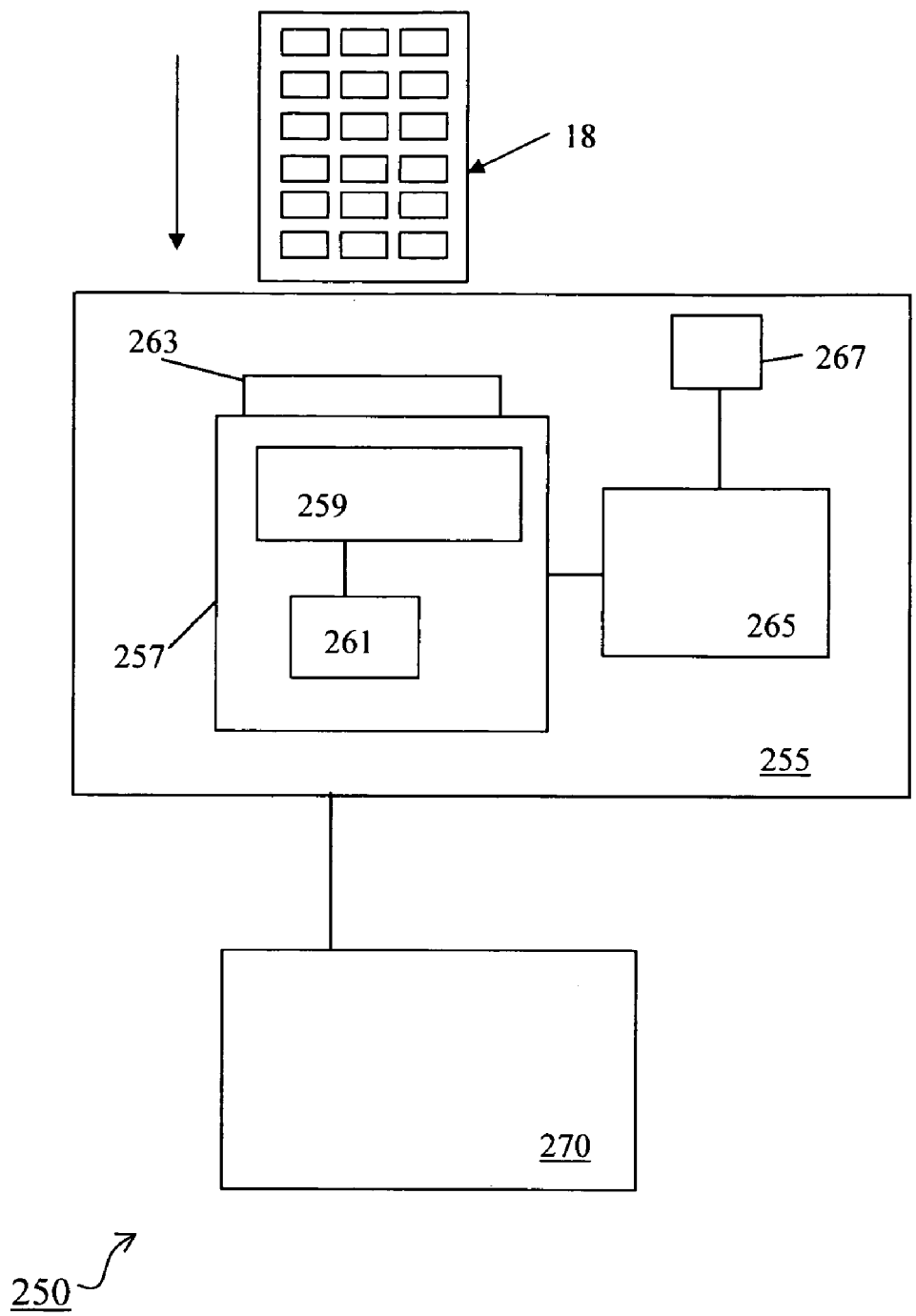
FIG. 4 is a simplified block diagram of an apparatus for registering data to be fixed on media having at least one label portion and one or more radio frequency identification tags according to the invention.

Having described the details of a system for determining the position of tags on print media having radio frequency data storage devices embedded therein, FIG. 4 illustrates the essential components of such a system in simplified block diagram form. Specifically, FIG. 4 shows a system 250 having a printing subsystem 255 that may include many of the operational components of a typical printer assembly, such as printer assembly 14. The printing subsystem 255 includes a printer housing 257 in which a print engine 259 resides. Printing subsystem 255 also has memory 261 for storing data indicating the position of labels 20 or devices 88 on media, such as media 18. The contents of memory 261 can be obtained from an end-user application 270 which may supply the position data to the printing subsystem 255 in a print data stream, for example.

The printer housing 257 includes an opening 263 into which the print media 88 may be fed into the printing subsystem 255 for printing on the media 18. As the media 18 is fed into the printing subsystem 255, a radio frequency reader 265 reads the data pre-programmed into the devices 88 on the media 18. Antenna 267 is provided for this purpose. In this way, the reader 265 reads data indicating an expected orientation from the radio frequency memory storage devices, such as devices 88, and the printing subsystem 255 compares the expected orientation data with actual orientation data contained to determine if a registration operation should be performed. Thus, the invention utilizes the ability to rotate and/or flip images and/or media in order to correctly register an image on a label and the corresponding data associated with the label on a corresponding device.

It should be understood that modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. In an image forming system supporting image fixing operations on media having at least one label portion and one or more embedded radio frequency data storage devices, a method of registering data to be fixed-on the media based on the orientation of said label portion, the method comprising the steps of:
   determining the expected orientation of the media;
   determining a current orientation of the media as the media is fed through a media pathway of the image forming system;
   if the current orientation does not match the expected orientation, the image forming system performing an image registration operation before an image is fixed on the label portion;
   the image forming system determining the X/Y position of the radio frequency data storage device about the media; and
   if the current orientation does not match the expected orientation, the image forming system reassigning data to be programmed to said radio frequency data storage device.

2. The method of claim 1 wherein said image registration operation involves either rotating said image and/or flipping said media.

3. The method of claim 2 wherein said image is rotated about an axis parallel to the direction of travel of the media.

4. The method of claim 2 wherein said image is rotated about an axis perpendicular to the direction of travel of the media.

5. The method of claim 2 further comprising the steps of:
   the image forming system printing data on the label portion of said media;
   the image forming system writing data to at least one of said radio frequency.

6. The method of claim 1 further comprising the step of generating a paper orientation error in case an image registration operation cannot be performed.

7. An image forming system supporting image fixing operations on media having at least one label portion and one or more embedded radio frequency data storage devices, said system capable of registering data to be fixed on the media based on the orientation of said label portion, said system comprising:
   a media pathway through which said media is passed during an image fixing operation;
   a detector for sensing the orientation of said media as it passes through said media pathway; a memory device adapted for storing data indicating the relative position of said one or more devices in relation to the orientation of said media; and
   control logic for determining the expected orientation of said media, causing said detector to sense a current orientation of the media as the media is fed through said media pathway and, if the current orientation does not match the expected orientation, causing an image registration operation to be performed before an image is fixed on the label portion.

8. The system of claim 7 further comprising a radio frequency reader/programmer for writing data to any one of said radio frequency data storage devices.

9. The system of claim 8 wherein data is related to at least one image fixed to said label portion of said media.

10. The system of claim 8 wherein said reader/programmer reads pre-programmed position data from at least one of said radio frequency data storage devices in order to determine an expected orientation of said media.

11. The system of claim 7 wherein said control logic is further adapted for causing said image to be rotated and/or flipped relative to orientation of said media.

12. The system of claim 11 wherein said control logic is further adapted for causing said image to be rotated about an axis parallel to the direction of travel of said media.

13. The system of claim 11 wherein control logic is further adapted for causing said image to be rotated about an axis perpendicular to the direction of travel of said media.

14. The system of claim 7 wherein said control logic is further adapted for generating a paper orientation error in case an image registration operation cannot be performed.

15. The method of claim 7 wherein said control logic is further adapted for causing said detector to sense the X/Y position of a radio frequency data storage device on said media and, if the current orientation does not match the expected orientation, for causing a reassignment of data to be programmed to said radio frequency data storage device.

16. Apparatus for registering data to be fixed on media having at least one label portion and one or more radio frequency identification tags for storing data related to said label portion, said apparatus comprising:

a printer assembly having a media pathway and a print engine for achieving a plurality of printing functions;

an interface coupling said printer assembly to a radio frequency reader/programmer capable of reading data from or writing data to radio frequency identification tags;

a memory device adapted for storing data indicating the relative position of said one or more radio frequency identification tags in relation to the orientation of said media; and control logic for comparing a current orientation of media to an expected orientation of media as indicated by data stored in said memory device; wherein said control logic determines if the current orientation of said media does not match the expected orientation and causes an image registration operation to be performed before an image is fixed on the label portion.

17. The apparatus of claim 16 wherein said control logic is adapted for determining the presence and location of radio frequency identification tags on said media.

18. The apparatus of claim 16 wherein the expected orientation of said media is contained in a print request data stream received by the printer assembly.

19. The apparatus of claim 16 wherein said control logic is further adapted for causing an image to be rotated and/or flipped relative to orientation of said media.

20. The apparatus of claim 16 wherein said control logic is further adapted for causing an image to be rotated about an axis parallel to the direction of travel of said media.

21. The apparatus of claim 16 wherein control logic is further adapted for causing said image to be rotated about an axis perpendicular to the direction of travel of said media.

22. The apparatus of claim 16 wherein said control logic is further adapted for generating a paper orientation error in case an image registration operation cannot be performed.

23. The apparatus of claim 16 wherein said control logic is further adapted for sensing the X/Y position of a radio frequency identification tag on said media and, if the current orientation of said media does not match the expected orientation, for causing a reassignment of data to be programmed to said radio frequency identification tag.

* * * * *